US009569750B2

(12) United States Patent
Taylor et al.

(10) Patent No.: US 9,569,750 B2
(45) Date of Patent: Feb. 14, 2017

(54) UTILIZING A SOCIAL NETWORK ACCOUNT TO PROVIDE ADDITIONAL FUNCTIONALITY TO A GAMING NETWORK ACCOUNT

(75) Inventors: Nathan Taylor, Scotts Valley, CA (US);
Jeff Watkins, Cupertino, CA (US);
Erik Strahm, San Francisco, CA (US);
Greg Hogan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 13/490,339

(22) Filed: Jun. 6, 2012

(65) Prior Publication Data

US 2013/0331179 A1     Dec. 12, 2013

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *G06Q 10/10* | (2012.01) |
| *G06Q 50/00* | (2012.01) |
| *H04L 12/58* | (2006.01) |

(52) U.S. Cl.
CPC .............. *G06Q 10/10* (2013.01); *G06Q 50/01* (2013.01); *H04L 51/32* (2013.01)

(58) Field of Classification Search
CPC ..... G06N 3/006; G06N 3/008; A63F 2300/40; A63F 2300/402–2300/409; A63F 2300/55; A63F 2300/5533; A63F 2300/5546; A63F 2300/556; A63F 2300/5566
USPC ......................................................... 463/42
See application file for complete search history.

(56) References Cited

U.S. PATENT DOCUMENTS

| | | | |
|---|---|---|---|
| 2005/0054448 A1* | 3/2005 | Frerking et al. ............... | 463/42 |
| 2011/0087732 A1 | 4/2011 | Lakshmanan | |
| 2011/0126272 A1 | 5/2011 | Betzler | |
| 2012/0015741 A1* | 1/2012 | Craine et al. .................. | 463/42 |

FOREIGN PATENT DOCUMENTS

| | | |
|---|---|---|
| JP | 2008036323 A | 2/2008 |
| WO | 2009042563 | 4/2009 |

OTHER PUBLICATIONS

"Xbox Live," Microsoft, Nov. 15, 2002, Wikipedia article http://en.wikipedia.org/wiki/Xbox_Live.*

(Continued)

*Primary Examiner* — Kevin Y Kim
(74) *Attorney, Agent, or Firm* — Blank Rome LLP

(57) ABSTRACT

A method to provide additional gaming network functionality links a user's gaming network identity with the user's social network identity. Linkage of the user's gaming network and social network identities establishes a two way communication link by which a gaming (social) network service can obtain information from, and send information to, a social (gaming) network service on behalf of the user. The gaming (social) network service may obtain information regarding the social (gaming) network relationships of the user's social (gaming) network identity and suggest gaming (social) network relationships to the user based on the social (gaming) network relationships. The gaming (social) network service additionally enables a user having linked identities to post gaming (social) network related messages as social (gaming) network messages via their social (gaming) network identity.

12 Claims, 5 Drawing Sheets

(56) References Cited

OTHER PUBLICATIONS

Christer Persson, "Linking social networks with virtual worlds and online games," Jan. 2011, http://www.diva-portal.org/smash/get/diva2:424919/FULLTEXT01.pdf.*

Mike Snider, "Blizzard and Facebook's friendly social networking deal launches with 'StarCraft II'," May 5, 2010, http://content.usatoday.com/communities/gamehunters/post/2010/05/blizzard-and-facebooks-friendly-social-networking-deal-launches-with-starcraft-ii-/1#.VP87ePldXuw.*

Giant Bomb, "Achievements," discussing achievements released in Oct. 2008, http://www.giantbomb.com/achievements/3015-29/.*

Wowhead, "Achievement linking macro?" Apr. 5, 2009, http://www.wowhead.com/forums&topic=86713/achievement-linking-macro.*

Extended European Search Report received in EP Application No. 13170617.8, dated Aug. 6, 2013.

Walls, C., Donald K.: "Service Provider 'Connect' Framework," Spring Social Reference Manual, Dec. 31, 2011, XP002706001, Retrieved from the Internet: http://static.springsource.org/spring-social/docs/1.0.0.M2/reference/html/ serviceprovider.html on Jul. 25, 2013.

* cited by examiner

UTILIZING A SOCIAL NETWORK ACCOUNT TO PROVIDE ADDITIONAL FUNCTIONALITY TO A GAMING NETWORK ACCOUNT

BACKGROUND

This disclosure relates generally to a technique for integrating a user's social network account with the user's gaming network account to provide additional gaming network functionality.

With the advancement in processing power and functionality of mobile devices, video game applications, which were once reserved for stand-alone gaming systems, have become an extremely popular category of applications for these devices. Based on the popularity of gaming applications and the connected nature of the mobile devices on which they are often executed, a relatively recent development is a gaming network service that allows users to establish relationships with friends, initiate games with these friends, and track game statistics with respect to friends and other game users from within the gaming network. Developers of gaming applications that are compatible with the gaming network provide functionality in the gaming application that enables the application to interface with the gaming network to provide scores, statistics, and the ability to initiate the game from within the gaming network. One example of this type of gaming network is the Apple® Game Center service. (APPLE is a registered trademark of Apple Inc.)

A gaming network is a type of social network in that it allows users to establish relationships with friends and to compete against and compare game statistics with these friends. While a gaming network allows a user to establish relationships and control their gaming experience from a single location, some users may not utilize the full capability that a gaming network provides. For example, a user may not be aware of acquaintances that also have gaming network identities.

In order to facilitate the establishment of gaming network relationships, a gaming network service may provide automatic friend recommendations based on various factors. For example, the gaming network may recognize an overlap in the friends of two gaming network users and may provide friend recommendations to one of the users based on friends of the other. In addition, the gaming network service may obtain contacts from an email account of a user and search for gaming network users associated with any of the obtained email addresses. The gaming network might also allow a user to manually search for gaming network friends by email address, user identity, etc. While these methods may allow a user to establish relationships over time, it would be beneficial to provide another mechanism to facilitate the establishment of gaming network relationships.

A gaming network user having a gaming network identity may also be a social network user having a different social network identity. Example social networks may include Facebook®, Twitter®, and LinkedIn®. (FACEBOOK is a registered trademark of Facebook, Inc, TWITTER is a registered trademark of Twitter, Inc. LINKEDIN is a registered trademark of LinkedIn Corporation.) Oftentimes, it will be the case that the user has a much more established set of relationships in the social network than in the gaming network. For example, a new user of a gaming network may have very few gaming network friends but may have hundreds or thousands of social network friends. Many of the user's social network friends may also have gaming network identities and may be in a similar situation of having relatively few gaming network friends. It would be beneficial to take advantage of a user's already established social network relationships and the functionality of the social network to maximize a user's gaming network experience.

SUMMARY

In one embodiment, a method includes determining, by a client-side gaming network application, that a user of a device on which the application is installed has both a gaming network identity and a social network identity. The client-side gaming network application may then send a request to a server-side gaming network application to link the user's gaming network and social network identities and receive, in response, one or more gaming network relationship recommendations based on social network relationships of the user's social network identity.

In another embodiment, a computer program product includes instructions to cause a processor to receive a request to link a user's gaming network and social network identities, obtain access to the user's social network account, and receive a relationship map that includes social network identities that have a social network relationship with the user's social network identity.

In still another embodiment, a device includes program code stored in a memory of the device that causes the device's processor(s) to send a request to link a gaming network identity with a social network identity of the device's user, receive an indication that the gaming network identity and the social network identity were successfully linked, and allow the user to send a gaming network related message to be communicated as a social network message via the user's social network identity.

DETAILED DESCRIPTION

This disclosure pertains to systems, methods, devices, and computer program products for integrating the functionality of a social network with the functionality of a gaming network. In general, techniques are disclosed for linking a user's gaming network identity with the user's social network identity. More particularly, the linking of a user's gaming network identity with the user's social network identity can enable two way communications between the gaming network service and the social network service so that the gaming network service can obtain information from, and deliver information to, the social network service.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of gaming network services having the benefit of this disclosure.

Figure 1:
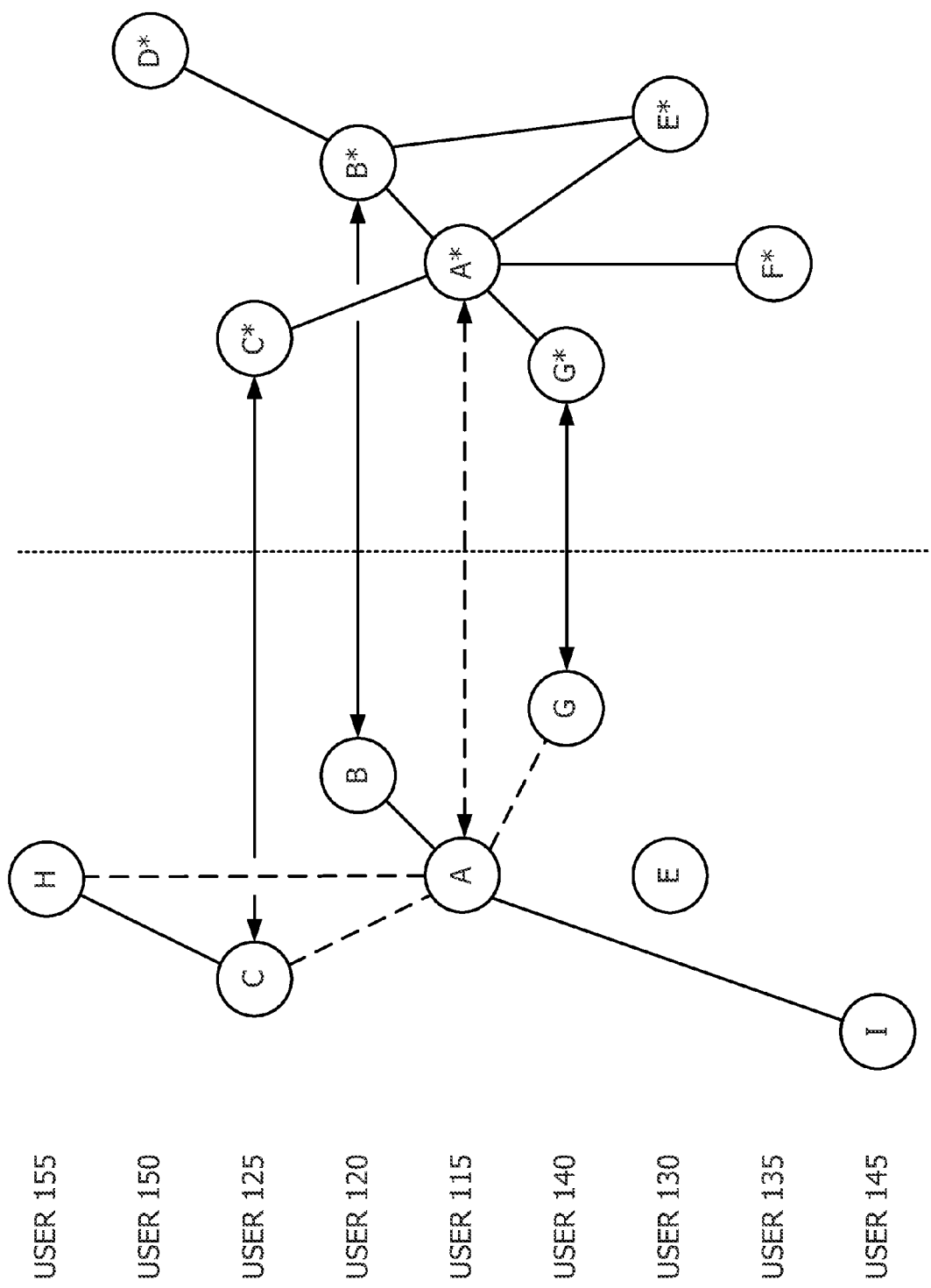
FIG. 1 is a block diagram illustrating the relationships of a user having a gaming network identity and a social network identity and a beneficial effect of linking the gaming network identity and the social network identity in accordance with one embodiment.

Referring to FIG. 1, a block diagram illustrates the relationships between various gaming network 105 and social network 110 identities. As used herein, gaming network 105 and social network 110 refer to the functionality provided by a gaming network service and a social network service, respectively, in providing a forum in which users can interact with their applications and with other users. As will be described below, some functionality provided by these services will be implemented by a server-side application while other functionality will be implemented by a client-side application.

In FIG. 1, identities on a common horizontal line represent the identities of a single user. For example, user 115 has a gaming network identity A and a social network identity A*. The solid lines within each of gaming network 105 and social network 110 represent existing relationships between the various identities. The dashed lines represent potential new relationships for user 115 in gaming network 105 based on the linkage of user 115's gaming network identity A with their social network identity A*. Finally, the lines between a gaming network identity and a social network identity represent linked identities.

In the relatively simple example illustrated, user 115 has a more established set of relationships in social network 110 than in gaming network 105. For example, in social network 110, user 115 has direct relationships with user 120 (B*), user 125 (C*), user 130 (E*), user 135 (F*), and user 140 (G*). Conversely, in gaming network 105, user 115 has direct relationships with only user 120 (B) and user 145 (I). Users 115 (A/A*), 120 (B/B*), 125 (C/C*), 130 (E/E*), and 140 (G/G*) have both a social network identity and a gaming network identity. Users 150 (D*) and 135 (F*) have a social network identity but have not yet established a gaming network identity. Likewise, users 155 (H) and 145 (I) have a gaming network identity but have not established a social network identity. Of the five users (115, 120, 125, 130, and 140) having both a social network identity and a gaming network identity, users 120 (B/B*), 125 (C/C*), and 140 (G/G*) have linked their social network and gaming network identities. User 115 (A/A*) is considering linking their social network and gaming network identities (illustrated by the dashed line between gaming network identity A and social network identity A*).

Based on the linkage of user 115's gaming network identity and social network identity, gaming network 105 may automatically suggest several relationships to user 115. When user 115 selects to link their gaming network identity A with their social network identity A*, user 115's gaming network account obtains a relationship map from user 115's social network account. The relationship map identifies user 115's direct social network relationships with user 120, user 125, user 130, user 135, and user 140 along with those users' social network identities. Because users 125 and 140 have linked their gaming network and social network identities, gaming network 105 can recognize user 125 as gaming network identity C and user 140 as gaming network identity G. Moreover, because users 125 and 140 have a direct social networking relationship with user 115, gaming network 105 may suggest that user 115 form a gaming network relationship with those users.

In one embodiment, gaming network 105 records may be maintained in a global data store that associates a gaming network identity with a social network identity for each user that has linked their gaming network and social network identities. Each identity may uniquely identify a user in a particular network (e.g., A* uniquely identifies user 115 in social network 110). In one embodiment, in response to a user linking their gaming network and social network identities, gaming network 105 may query the data store for each of the social network identities identified in an obtained relationship map as having a direct relationship with the user. Therefore, in the case illustrated in FIG. 1, a data store may be queried for social network identities B*, C*, E*, F*, and G* in response to obtaining user 115's social network relationship map and may identify matches for B*, C*, and G*, corresponding to users 120, 125, and 140 and gaming network 105 identities B, C, and G.

In another embodiment, gaming network 105 may suggest additional ancillary relationships based on the linking of user 115's social network identity A* with their gaming network identity A. For example, based on the recognition of user 125 as having a direct social network relationship with user 115, and based on user 125's direct gaming network relationship with user 155, gaming network 105 may additionally suggest a relationship between users 115 and 155 according to a "friend of a friend" matching feature.

As illustrated, the linkage of user 115's gaming network identity A with their social network identity A* may facilitate the creation of several gaming network relationships. For purposes of clarity, the illustrated embodiment includes a small number of gaming network and social network relationships. In reality, a user may have hundreds or thousands of social network relationships, which may facilitate the creation of many more gaming network relationships than are illustrated in FIG. 1. It should be noted that although user 130 has a direct social network relationship with user 115, gaming network 105 may not be able to suggest a gaming network relationship between users 115 and 130 because user 130 has not linked their gaming network and social network identities (E and E*, respectively). For example, although user 115's relationship map may indicate a direct relationship with user 130, a query of the gaming network 105 data store for user 130's social network identity E* may not return a match because user 130 has not linked their gaming network and social network identities. While this represents a missed opportunity to create a gaming network relationship, additional functionality of the linking of social network and gaming network identities may foster the creation of this relationship as described in greater detail below. This additional functionality might also induce users of social network 110 to create a gaming network identity. For example, as will also be described in greater detail below, user 135 may be induced to create a gaming network identity based on user 115's linkage of their gaming network and social network identities.

Figure 2:
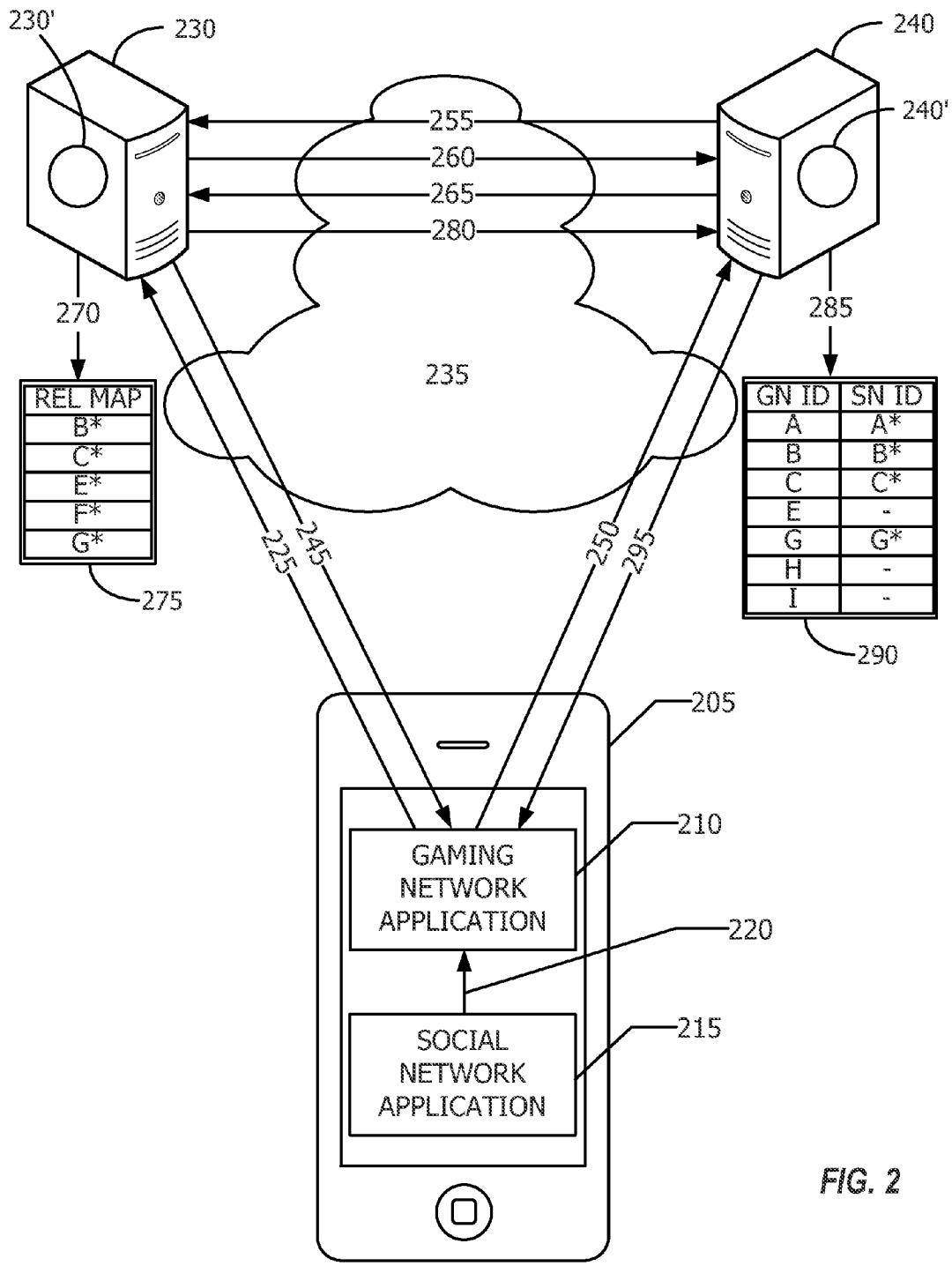
FIG. 2 is a block diagram illustrating the process by which a user's gaming network identity and social network identity may be linked in accordance with one embodiment.

Referring to FIG. 2, a block diagram illustrates a process by which the linking of a user's gaming network identity and social network identity may be initiated from device 205 in accordance with one embodiment. Device 205 may be a personal digital assistant (PDA), personal music player, mobile telephone, notebook, laptop, desktop or a tablet computer and is described in greater detail below with respect to FIG. 5. Device 205 has installed thereon client-side gaming network application 210 (hereinafter gaming network application 210) and client-side social network application 215 (hereinafter social network application 215). As set forth above, gaming network application 210 may allow the user to initiate and track multiple gaming applications installed on device 205 through gaming network 105. Likewise, social network application 215 may allow the user to communicate with acquaintances via social network 110.

At 220, gaming network application 210 obtains a user's social network credentials. Social network credentials may be any identifying information that allows a user to interact via social network 110 using a particular social network identity. In one embodiment, the user's social network credentials may include a username and password combination. In one embodiment, gaming network application 210 may attempt to obtain the user's social network credentials at the request of the user. In another embodiment, gaming network application 210 may attempt to obtain the user's social network credentials without being requested to do so by the user. In the illustrated embodiment, gaming network application 210 obtains the user's social network credentials directly from social network application 215. Social network application 215 may store the user's social network credentials such that the user may not have to enter the credentials each time they wish to communicate via social network 110. Thus, gaming network application 210 may request the credentials directly from social network application 215. Before providing the credentials to gaming network application 210, social network application 215 may prompt the user to consent to the sharing of the credentials with gaming network application 210.

In another embodiment, the user's social network credentials may not be obtained directly from social network application 215. For example, in one embodiment, gaming network application 210 may obtain the user's social network credentials as a direct input from the user. The social network credentials may be obtained in this manner in response to a request by the user to link the user's gaming network identity with their social network identity. As such, it is not necessary that social network application 215 be installed on device 205. In another embodiment, gaming network application 210 may search a predefined memory location of device 205 that is utilized to store social network credentials. In such an embodiment, gaming network application 210 may search for the user's social network credentials upon installation of gaming network application 210 on device 205, when gaming network application 210 is launched for a first time, each time gaming network application 210 is launched, or at any other appropriate times. In response to obtaining the user's social network credentials, gaming network application 210 may determine that the user has both a gaming network identity and a social network identity and may prompt the user to link their gaming network identity with their social network identity.

When a user of device 205 consents to linking their gaming network identity with their social network identity, gaming network application 210 may cause device 205 to transmit a request 225 to obtain gaming network specific credentials to social network server 230 via network 235. Request 225 may include the user's social network credentials and can be provided to server-side social network application 230' executing on social network server 230. In one embodiment, the user's social network credentials may be transmitted in an encrypted form. Network 235 may take any form including, but not limited to, a local area network (LAN) or a wide area network (WAN) such as the Internet. Further, network 235 may use any desired technology (wired, wireless or a combination thereof) and protocol (e.g., transmission control protocol, TCP).

In response to receiving request 225, server-side social network application 230' can authenticate the user based on the provided social network credentials. If the user is properly authenticated, server-side social network application 230' may generate the requested gaming network specific credentials. In one embodiment, the gaming network specific credentials are randomly generated by server-side social network application 230'. The gaming network specific credentials uniquely identify a user's social network identity and can be used by server-side gaming network application 240' executing on gaming network server 240 to communicate directly with server-side social network application 230' on behalf of the user. For example, the gaming network specific credentials may allow server-side gaming network application 240' to obtain the user's social network relationship map and to create social network messages using the user's social network identity. The gaming network specific credentials may be transmitted to device 205 as response 245. Although FIG. 2 illustrates gaming network application 210 as communicating with social network server 230 to obtain gaming network specific credentials, alternate means of obtaining these credentials will be understood by those of skill in the art. For example, social network application 215 may perform this operation on behalf of gaming network application 210. That is, gaming network application 210 may simply request gaming network specific credentials from social network application 215 and social network application may obtain the gaming network specific credentials and provide them to gaming network application 210. In such an embodiment, gaming network application 210 would not need to obtain the user's social network credentials.

Regardless of the mechanism utilized to obtain gaming network specific credentials, gaming network application 210 can send request 250 to server-side gaming network application 240' executing on gaming network server 240 to initiate the linkage of the user's gaming network and social network identities. In one embodiment, request 250 will include the user's gaming network identity as well as the gaming network specific credentials to be utilized by server-side gaming network application 240' to communicate with server-side social network application 230' on behalf of the user.

In one embodiment, upon receiving request 250, server-side gaming network application 240' may send request 255 for a token to server-side social network application 230'. In the depicted embodiment, communications between social network server 230 and gaming network server 240 are illustrated as occurring over common network 235. In an alternate embodiment, social network server 230 and gaming network server 240 may be connected via a separate network from that used for communications with device 205. Request 255 can include authentication information that uniquely identifies gaming network server 240 to social network server 230.

If server-side social network application 230' properly authenticates gaming network server 240, server-side social network application 230' may send response 260 that includes a gaming network server token. In one embodiment, the gaming network server token is transmitted in an encrypted form. In another embodiment, the gaming network server token is a data string that can be presented along with a user's gaming network specific credentials before the server-side social network application will perform any actions requested by the server-side gaming network application. This ensures that only predefined devices (e.g., gaming network server 240) that are capable of presenting proper authentication information to server-side social network application 230' will be permitted to act on behalf of a user in social network 110 by presenting both the server token and the user's gaming network specific credentials. In the depicted embodiment, the token provided in response 260 is unique to a specific user. That is, server 240 provides authentication information to server 230 and server-side social network application 230' generates a unique token for each different user that requests to link their social network and gaming network identities. In an alternate embodiment, server authentication operation 255/260 may only be performed once or may be performed at predefined time intervals. In such an embodiment, server-side gaming network application 240' may use a single token for all interactions with server-side social network application 230'.

Server-side gaming network application 240' may then send request 265 to link the user's gaming network identity with their social network identity to server-side social network application 230'. Request 265 can include the user's gaming network specific credentials as well as the gaming network server token. Because the gaming network specific credentials uniquely identify the user's social network identity as discussed above, server-side social network application 230' can utilize the gaming network specific credentials to access the user's social network account. That is, the gaming network specific credentials may allow server-side gaming network application 240' to obtain access to information relating to the user's social network identity as well as to act on behalf of the user (i.e., post messages, create friend requests, etc.) using the social network identity. The server-side social network application may generate 270 relationship map 275 based on established relationships identified by the user's social network identity. In the relatively simple embodiment illustrated, the relationship map 275 for user 115 (FIG. 1) includes the direct relationships for user 115's social network 110 identity A*. In another embodiment, relationship map 275 may include additional information such as length of relationships, relationship status (e.g., identifying B* as A*'s spouse), frequency of interactions, etc.

After obtaining relationship map 275, server-side social network application 230' can send response 280 to server-side gaming network application 240' that includes relationship map 275 as well as any additional relevant information regarding the user's social network identity. In addition to initial response 280, server-side social network application 230' may continue to monitor the user's social network identity and can send updates to server-side gaming network application 240' when any updates are made to the user's social network identity. For example, server-side social network application 230' may generate and transmit 280 an updated relationship map when user 115's identity A* creates or terminates a social network relationship. Server-side social network application 230' may continue the monitoring process until the user terminates their social network or gaming network identity, requests that the identities be unlinked, or performs another action that results in the termination of the monitoring process.

Upon receiving response 280, server-side gaming network application 240' may query 285 global data store 290 that maintains the gaming network identities of all gaming network users along with corresponding social network identities for users that have linked those identities. To continue the example of FIG. 1, global data store 290 may include gaming network identities (A, B, C, E, G, H, I) for each user of gaming network 105. For users that have linked their gaming network and social network identities, corresponding social network identities (A*, B*, C*, G*) can also be provided in global data store 290. Query 285 may search the social network identifier field (SN ID) of global data store 290 for each of the direct relationships of social network identity A* included in the received relationship map 275. As such, query 285 may return gaming network identities B, C, and G as matches for social network identities B*, C*, and G*, which correspond to direct social network relationships of gaming network identity A as indicated in relationship map 275. Server-side gaming network application 240' may then determine that gaming network identity A has already established a gaming network relationship with gaming network identity B but has not established a gaming network relationship with identities C or G. Server-side gaming network application 240' may periodically perform querying operation 285 to identify new friend recommendations based on new users linking their social network and gaming network identities.

Based on identified matches, server-side gaming network application 240' may send gaming network friend recommendations 295 to gaming network application 210. In one embodiment, the friend recommendations may constitute an indication that the user's gaming network and social network identities have been successfully linked. In another embodiment, a separate message may be sent from server-side gaming network application 240' to gaming network application 210 indicating that the user's gaming network and social network identities have been successfully linked. In response to the indication that the user's gaming network and social network identities have been successfully linked, additional functionality of the gaming network application 210 may be made available. For example, once the identities are linked, the gaming network application may allow a user to distribute gaming network related messages (e.g., gaming network accomplishments, gaming network friend requests, etc.) as social network messages via the user's social network identity.

To continue the example from above, server-side gaming network application 240' may send friend recommendations 295 that allow user 115 to initiate gaming network relationships with gaming network identities C and G. In one embodiment, the friend recommendations 295 may include a selectable object that allows a user to send a direct request to initiate a gaming network relationship with the gaming network identity indicated in the friend recommendation. In another embodiment, server-side gaming network application 240' may automatically establish gaming network relationships between users that have direct social network relationships and have linked their social network and gaming network identities. In one embodiment, such automatic relationship establishment may be contingent upon a user selecting a setting option that allows the creation of automatic gaming network relationships in such a manner. The illustrated process results in the establishment of a two-way relationship between a user's social network identity and their gaming network identity by which server-side gaming network application 240' may obtain information from, and send information to, server-side social network application 230' on behalf of the user.

Figure 3:
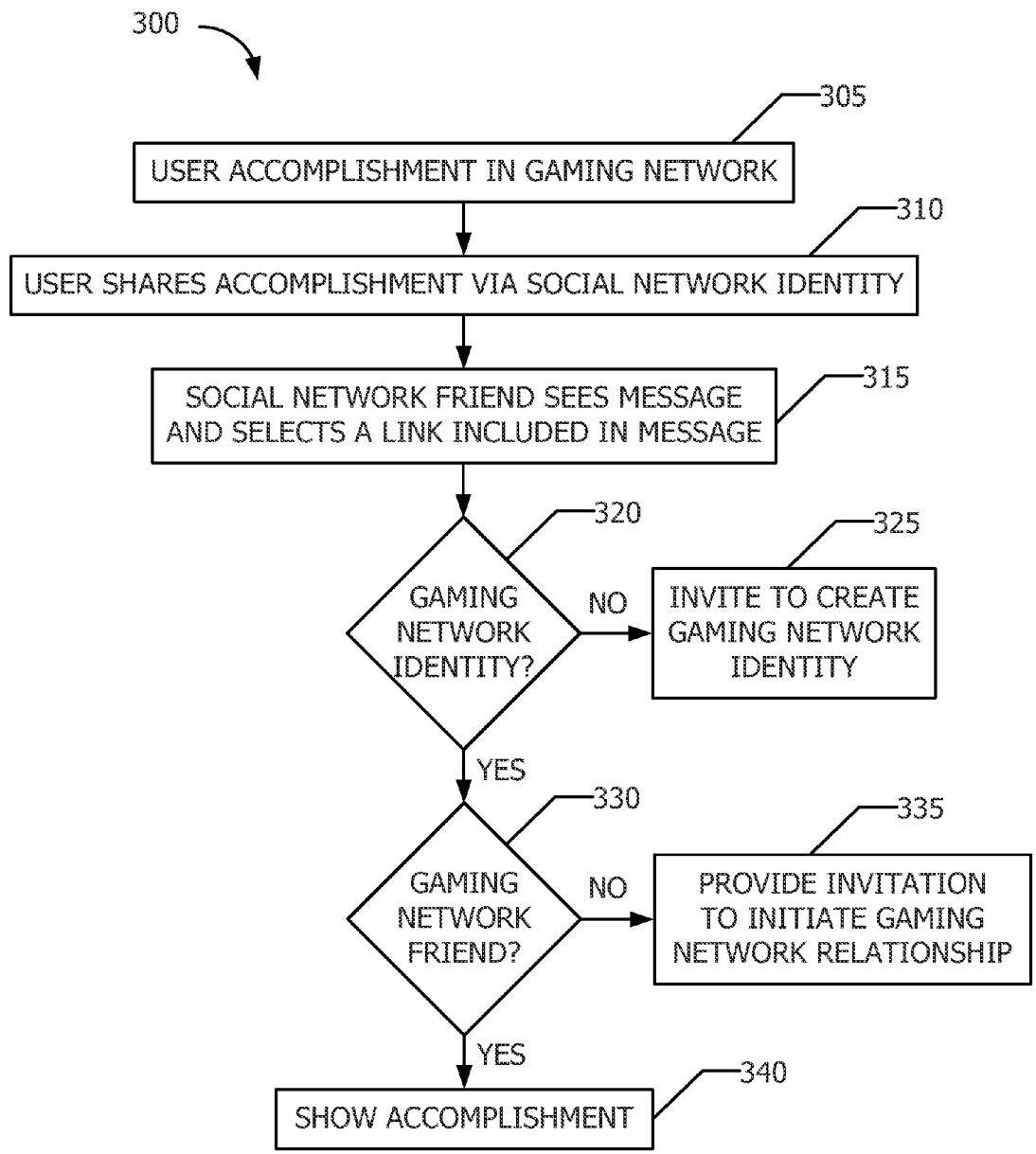
FIG. 3 is a flowchart illustrating a process by which a user may share gaming network accomplishments through their social network identity in accordance with one embodiment.

Referring to FIG. 3, network application operation 300 determines a user has a gaming network accomplishment (block 305). The accomplishment may be a new high score among the user's gaming network friends, a new global high score for a particular game over a particular time period, a gaming network achievement (e.g., an accumulated points total based on results of all games that the user has played within gaming network 105), etc. In one embodiment, the accomplishment can be visible within gaming network 105. For example, the accomplishment may be displayed as a top ranking in a leaderboard among friends in gaming network 105. Because the user has linked their gaming network identity with their social network identity, gaming network application 210 may enable the user to share the accomplishment as a message via the user's linked social network identity (block 310). In one embodiment, the accomplishment may be transmitted from gaming network application 210 to server-side gaming network application 240'. Server-side gaming network application 240' may then create a social network message on behalf of the user and transmit the message to server-side social network application 230' along with the gaming network specific credentials and gaming network server token. Server-side social network application 230' may then cause the message to be communicated via social network 110 and attributed to the user. Therefore, the linking of a user's gaming network identity and social network identity permits the user to share gaming network related messages via their social network identity. While the accomplishment is described as being shared via a social network message, the accomplishment may be shared via a social network status update, a social network post, etc.

In one embodiment, the shared accomplishment may include a selectable link. In one embodiment, the selectable link may include a uniform resource locator (URL). By sharing the gaming network accomplishment via the user's social network identity, other users that have a social network relationship with the user that shares the accomplishment will see the accomplishment. These other users may not have a gaming network relationship with the user sharing the accomplishment and may not even have a gaming network identity. As such, linkage of a user's gaming network and social network identities may facilitate the communication of gaming network accomplishments to a broader audience.

A user having a social network relationship with the user that shared the accomplishment may see the message and select the link included with the message (block 315). It is then determined whether the user that selected the link has a gaming network identity (block 320). In one embodiment, it may be determined that the user that selected the link has a gaming network identity if gaming network application 210 is installed on the device from which the link was selected. In another embodiment, it may be determined that the user that selected the link has a gaming network identity if the device from which the link was selected has account information stored in a predetermined location for gaming network 105, if it is determined that the user that selected the link does not have a gaming network 105 identity (the "NO" prong of block 320), the link may cause an invitation to be displayed (block 325) inviting the user to create a gaming network identity and/or to download gaming network application 210. For example, referring back to the example provided in FIG. 1, user 135 (F*) has a social network relationship with user 115 (A*) but does not have a gaming network identity. Therefore, user 135 may see the social network message identifying user 115's gaming network accomplishment and may select the associated link. Because user 135 does not have a gaming network identity, however, the link will cause an invitation to create a gaming network identity to be displayed to user 135. In one embodiment, the link may cause the device to display a gaming network marketing webpage. In another embodiment, the invitation may cause the device to launch a media distribution application such as Apple's App Store™ and to display an interface that enables the user to acquire gaming network application 210. (APP STORE is a trademark of Apple Inc.) Therefore, one user's linkage of their gaming network and social network identities may induce other users to acquire gaming network application 210 and to create a gaming network identity.

If it is determined that the user that selected the link has a gaming network identity (the "YES" prong of block 320), the link may cause gaming network application 210 to be launched. It may then be determined whether the user that selected the link has a gaming network relationship with the user that shared the accomplishment (block 330). If it is determined that the user that selected the link does not have a gaming network relationship with the user that shared the accomplishment (the "NO" prong of block 330), the user that selected the link may be invited to initiate a gaming network relationship with the user that shared the accomplishment (block 335). For example, referring again to the example provided in FIG. 1, user 130 has both a social network identity (E*) and a gaming network identity (E). User 130 has a social network relationship but not a gaming network relationship with user 115. Therefore, user 130 may see a social network message identifying user 115's gaming network accomplishment and may select the associated link. The link may cause gaming network application 210 to be launched on user 130's device. It may then be determined that user 130 does not have a gaming network relationship with user 115. Accordingly, user 130 may be presented with an invitation to initiate a gaming network relationship with user 115. User 130 may also be invited to link their gaming network and social network identities. Alternatively, the user that shared the accomplishment may be prompted to create a gaming network relationship with the user that selected the link. In another embodiment, selection of the link may automatically create a gaming network relationship between the user that selected the link and the user that shared the accomplishment because the users necessarily have a social network relationship. Again, the creation of an automatic relationship may be contingent upon a user selecting a setting option that allows the creation of automatic gaming network relationships in such a manner. Therefore, one user's linkage of their gaming network and social network identities may foster the creation of subsequent gaming network relationships.

If it is determined that the user that selected the link has a gaming network relationship with the user that shared the accomplishment (the "YES" prong of block 330), the accomplishment may be displayed to the user that selected the link (block 340). In one embodiment, the link can cause a leaderboard that shows the accomplishment to be displayed within gaming network application 210. In addition to promoting the creation of gaming network relationships, the linkage of a user's gaming network and social network identities may enable gaming network accomplishments to be shared via social network 110 to a potentially broader audience. Moreover, the sharing of gaming network accomplishments via social network 110 may encourage additional users of social network 110 to begin using gaming network 105.

Figure 4A:
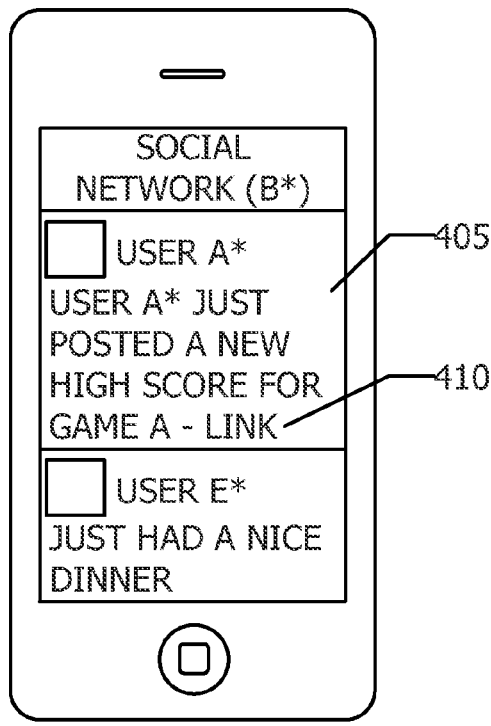
FIGS. 4A-4C illustrate example social network user interfaces illustrating the various gaming network related messages communicated as social network messages via a user's social network identity.
Figure 4B:
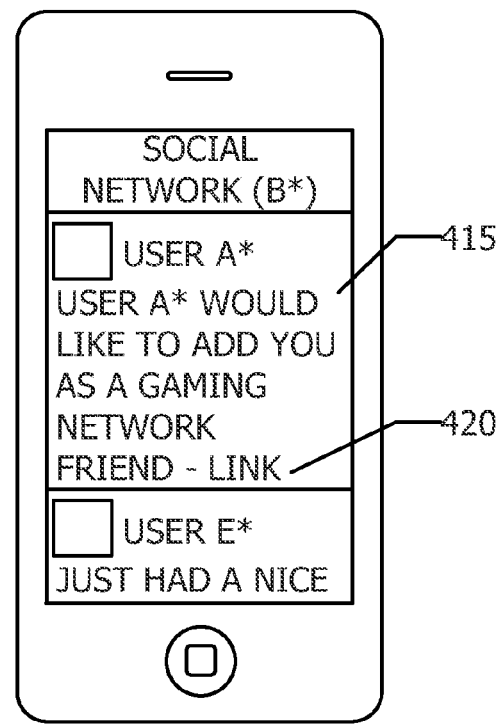
Figure 4C:
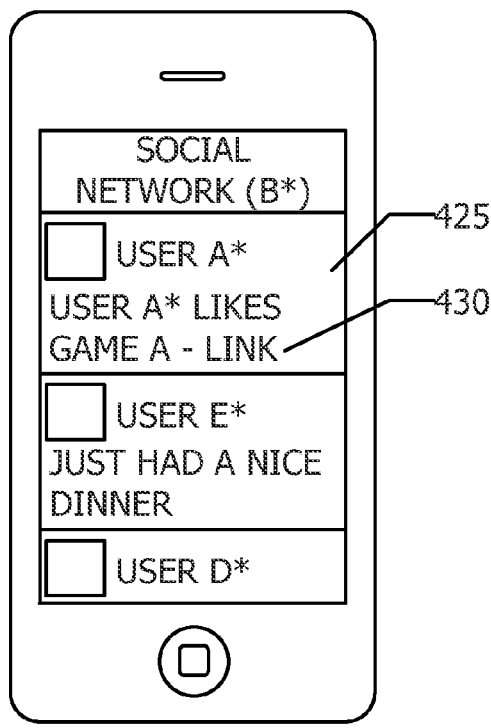

Referring to FIGS. 4A-4C, example social network user interfaces illustrate various gaming network related messages communicated as social network messages via a user's social network identity. In each of the figures, an example interface provided by social network application 215 as viewed by user 120 (B*) illustrates functionality enabled by the linkage of user 115's gaming network and social network identities. Referring first to FIG. 4A, user 120's social network application 215 interface displays message 405 indicating a gaming network accomplishment of user 115. As described above, message 405 may be initiated by user 115 directly from gaming network 105 (e.g., from within user 115's gaming network application 210). For example, gaming network application 210 may send a request to server-side gaming network application 240' to send message 405 to server-side social network application 230' to be displayed via social network 110. Moreover, as additionally described above, message 405 includes link 410 that causes user 115's accomplishment to be displayed and may additionally foster new gaming network 105 relationships for user 115. The gaming network accomplishment is displayed using user 115's social network identity (A*).

Referring to FIG. 4B, user 120's social network application 215 interface displays gaming network friend request 415 sent by user 115. Like message 405, friend request 415 may be initiated by user 115 directly from gaming network 105 (e.g., from within user 115's gaming network application 210). Because server-side gaming network application 240' will have access to each of user 115's social network relationships based on the relationship map 275, user 115 may send a friend request to any or all of the social network identities with whom they have a relationship. For example, gaming network application 210 may retrieve the list of identities from relationship map 275 from server-side gaming network application 240' and may select certain identities to whom friend request 415 should be generated. In response to receiving the list of social network identities to whom friend request 415 should be sent, server-side gaming network application 240' may send the requests to server-side social network application 230' to be displayed via social network 110. Accordingly, user 115 may be able to reach a wide audience of users by sending the request via their social network identity. Like message 405, friend request 415 may include selectable link 420. Selectable link 420 may function similarly to link 410. For example, link 420 may cause gaming network application 210 to be launched if it is installed on a device from which the link is selected. Rather than causing gaming network application 210 to display an achievement, however, link 420 may enable the user selecting the link to initiate a gaming network relationship with the user that sent friend request 415. Therefore, in addition to utilizing social network 110 to post accomplishments from gaming network 105, a user that has linked their gaming network and social network identities might also utilize social network 110 to send gaming network friend requests.

Referring to FIG. 4C, user 120's social network application 215 interface displays game recommendation 425 sent by user 115. Like message 405 and friend request 415, game recommendation 425 may be initiated by user 115 directly from gaming network 105 (e.g., from within user 115's gaming network application 210). For example, gaming network application 210 may display all games compatible with gaming network 105 that a user has installed on a device. The user may be able to select an option to send a recommendation for one or more of the listed games to be displayed via social network 110. In addition, a user may be able to send game recommendation 425 from within a game itself (i.e., outside of gaming network application 210). For example, gaming network application 210 may provide an application programming interface (API) that allows a game application developer to display a "recommend" option within a game application. Selection of the "recommend" option by a user may cause the game to send a recommendation through gaming network application 210 to be posted via social network 110. Like message 405 and friend request 415, game recommendation 425 may include selectable link 430. Link 430 may function similarly to links 410 and 420 but instead of displaying an accomplishment or initiating a gaming network relationship, link 430 may present a user selecting link 430 with an option to purchase a recommended game if the user selecting the link does not have the game or may allow the user to initiate a session of the game if the user does have the game. For example, if the user selecting link 430 does not have the recommended game, link 430 may cause a device to launch a media distribution application such as Apple's App Store and to display an interface that enables the user to purchase the recommended game. In one embodiment, if the user that selects link 430 already has the recommended game, link 430 may enable the user to initiate a session of the game or to request a session of the game against the user that posted game recommendation 425. Therefore, in addition to utilizing social network 110 to post accomplishments from gaming network 105 or to send friend requests 415, a user that has linked their gaming network and social network identities might also utilize social network 110 to send game recommendations 425.

Figure 5:
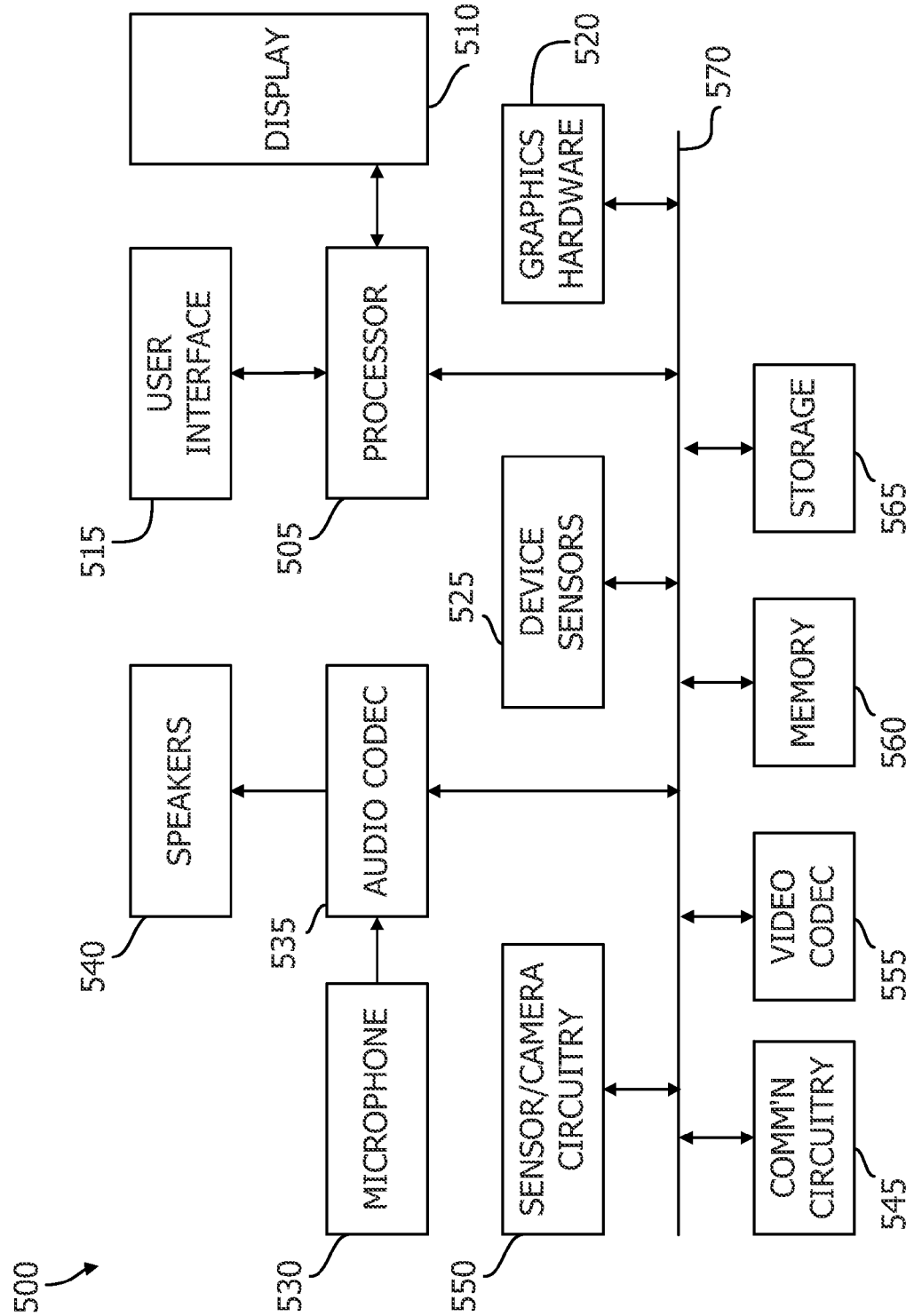
FIG. 5 is a block diagram illustrating an electronic device in accordance with one embodiment.

Referring to FIG. 5, a simplified functional block diagram of an illustrative electronic device 500 is shown according to one embodiment. Device 205, social network server 230, and gaming network server 240 may take the form of electronic device 500. Electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. Electronic device 500 may be, for example, a personal digital assistant (PDA), personal music player, mobile telephone, notebook, laptop, tablet, desktop, or server computer.

Processor 505 may execute instructions necessary to carry out or control the operation of many functions performed by device 500, Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. Moreover, although the specification has focused on the initiation of the described process from the gaming network application, the described process could just as easily be implemented from the social network application. That is, rather than the gaming network obtaining information from and sending information to the social network, the social network may obtain information from and send information to the gaming network. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
    receiving, at a server-side gaming network application, a request to link a first user gaming network identity with a first user social network identity;
    receiving, by the server-side gaming network application, a relationship map that includes one or more social network relationships associated with the first user social network identity;
    identifying, by the server-side gaming network application, from the one or more social network relationships included in the relationship map, a second social network identity that is linked with a second user gaming network identity;
    providing, by the server-side gaming network application, a gaming network relationship recommendation based on the identified social network identity;
    detecting, by the server-side gaming network application, a third user gaming network identity that has a gaming network relationship with the second user gaming network identity and that is not linked to a social network relationship in the relationship map;
    providing, by the server-side gaming network application, a gaming network relationship recommendation based on the detected third user gaming network identity;
    receiving, by the server-side gaming network application, an updated relationship map; and
    providing, by the server-side gaming network application, additional gaming network relationship recommendations based on the updated relationship map.

2. The method of claim 1, wherein receiving the request to link the first user gaming network identity with the first user social network identity comprises receiving gaming network specific credentials.

3. The method of claim 1, further comprising receiving, by the server-side gaming network application, a gaming network accomplishment.

4. A computer program embodied on at least one non-transitory computer-readable medium having stored thereon instructions to cause at least one processor to:
    receive a request to link a first user gaming network identity associated with a first user profile and a first user social network identity associated with the first user profile, wherein the first user gaming network identity is separate from the first user social network identity;
    obtain access to a social network account associated with the first user profile;
    access a relationship map that includes one or more social network relationships associated with the first user social network identity;
    identify, from the one or more social network relationships included in the relationship map, a second social network identity that is linked with a second user gaming network identity;
    provide a gaming network relationship recommendation based on the identified second social network identity;
    detect a third user gaming network identity that has a gaming network relationship with the second user gaming network identity and that is not linked to a social network relationship in the relationship map;
    provide a gaming network relationship recommendation based on the detected third user gaming network identity;
    monitor the social network account for an updated relationship map; and provide additional gaming network relationship recommendations based on the updated relationship map.

5. The computer program of claim 4, wherein the instructions to cause the at least one processor to receive the request to link the first user gaming network identity and the first user social network identity comprise instructions to cause the at least one processor to receive gaming network specific credentials associated with the first user profile.

6. The computer program of claim 5, wherein the instructions to cause the at least one processor to obtain access to the social network account comprise instructions to cause the at least one processor to present a gaming network server token and the gaming network specific credentials to a server-side social network application.

7. The computer program of claim 4, wherein the instructions further comprise instructions to cause the at least one processor to:
   receive a gaming network accomplishment associated with the first user profile; and
   communicate the gaming network accomplishment as a social network message via the first user social network identity associated with the first user profile.

8. The computer program of claim 7, wherein the social network message comprises a selectable link.

9. The computer program of claim 8, wherein the selectable link causes a client-side gaming network application to be launched when the link is selected from a device having the client-side gaming network application installed thereon.

10. A device comprising:
    memory;
    a network interface; and
    at least one processor communicatively coupled to the memory and the network interface and configured to execute a server-side gaming network application configured to:
    receive a request to link a first user gaming network identity with a first user social network identity;
    access a relationship map that includes one or more social network relationships associated with the first user social network identity;
    identify from the one or more social network relationships included in the relationship map, a second social network identity that is linked with a second user gaming network identity; and
    provide a gaming network relationship recommendation based on the identified second social network identity,
    detect a third user gaming network identity that has a gaming network relationship with the second user gaming network identity and that is not linked to a social network relationship in the relationship map;
    provide a gaming network relationship recommendation based on the detected third user gaming network identity;
    update the relationship map; and
    provide additional gaming network relationship recommendations based on the updated relationship map.

11. The device of claim 10, wherein the server-side gaming network application is further configured to receive a gaming network accomplishment.

12. The device of claim 10, wherein the server-side gaming network application configured to receive the request to link the first user gaming network identity with the first user social network identity is further configured to receive gaming network specific credentials.

\* \* \* \* \*